(12) United States Patent
Machuca

(10) Patent No.: US 10,730,343 B2
(45) Date of Patent: Aug. 4, 2020

(54) VEHICLE RIM PLASMA DISPLAY ASSEMBLY, APPARATUS AND INSERT

(71) Applicant: John P. Machuca, Albuquerque, NM (US)

(72) Inventor: John P. Machuca, Albuquerque, NM (US)

( * ) Notice: Subject to any disclaimer, the term of this patent is extended or adjusted under 35 U.S.C. 154(b) by 0 days.

(21) Appl. No.: 15/530,078

(22) Filed: Dec. 1, 2016

(65) Prior Publication Data

US 2018/0154685 A1 Jun. 7, 2018

(51) Int. Cl.
| | |
|---|---|
| *B60B 7/00* | (2006.01) |
| *B60B 7/20* | (2006.01) |
| *B60B 7/06* | (2006.01) |
| *H01J 17/16* | (2012.01) |
| *H01J 17/20* | (2012.01) |
| *H01J 17/36* | (2006.01) |
| *H01J 61/30* | (2006.01) |

(52) U.S. Cl.
CPC .............. *B60B 7/006* (2013.01); *B60B 7/068* (2013.01); *B60B 7/20* (2013.01); *B60B 2900/572* (2013.01); *B60K 2370/797* (2019.05); *H01J 17/16* (2013.01); *H01J 17/20* (2013.01); *H01J 17/36* (2013.01); *H01J 61/305* (2013.01)

(58) Field of Classification Search
CPC ........... B60B 7/006; B60B 7/20; B60B 7/068; B60Q 1/326; G09F 21/045; H01J 17/16; H01J 17/20; H01J 17/36
USPC ....................................................... 301/37.25
See application file for complete search history.

(56) References Cited

U.S. PATENT DOCUMENTS

| | | | |
|---|---|---|---|
| 514,170 A | 2/1894 | Tesla | |
| 1,643,593 A | 9/1927 | Styer et al. | |
| 2,158,968 A | 6/1939 | Moffat | |
| 2,526,548 A | 2/1947 | Franklin | |
| 2,954,629 A * | 10/1960 | Matin | B60B 7/20 40/587 |
| 3,190,178 A | 6/1961 | McKenzie | |
| 3,099,401 A | 7/1963 | Bell | |
| 3,113,727 A | 12/1963 | Bradway | |
| 3,340,389 A | 9/1967 | Senseman | |
| 3,405,025 A | 10/1968 | Goldman | |

(Continued)

FOREIGN PATENT DOCUMENTS

| | | | | |
|---|---|---|---|---|
| NL | 1009883 C1 * | 9/1999 | ............... | B60B 7/20 |
| WO | WO2006/051114 A1 | 5/2006 | | |

*Primary Examiner* — Kip T Kotter
(74) *Attorney, Agent, or Firm* — Thomas E. Lees, LLC

(57) ABSTRACT

In one embodiment, the present invention is a plasma disk assembly connectable to a vehicle's wheel assembly, the plasma disk assembly comprising a plasma disk assembly having a sealed plasma disk display encapsulating ionizable gas, at least one controllable power source for producing an output sufficient to ionize the gas in the plasma discharge tube and operably connected to the power supply for optionally adjusting the level of the energy to cause selective ionization of the gas in the plasma display to occur in differing amounts as a function of a changing stimulus connected to an input, at least one ball bearing system or mount, electrical connectors connecting the power source to the plasma disk, at least one pair of electrodes electrically coupling the electrical connectors to the ionizable gas in the plasma discharge tube, and at least one ballast system.

19 Claims, 5 Drawing Sheets

(56) References Cited

U.S. PATENT DOCUMENTS

| | | | | |
|---|---|---|---|---|
| 4,388,771 A | * | 6/1983 | Lalonde | G09F 21/045 301/37.25 |
| 4,430,692 A | | 2/1984 | Papadakis | |
| 4,562,516 A | | 12/1985 | Chastain | |
| 4,584,501 A | | 4/1986 | Cocks et al. | |
| 4,703,574 A | | 11/1987 | Garjian | |
| 4,742,278 A | | 5/1988 | Iannini | |
| 4,754,199 A | * | 6/1988 | Parker | H01J 65/042 273/161 |
| 4,782,431 A | | 11/1988 | Park | |
| 4,881,153 A | | 11/1989 | Scott | |
| 4,893,877 A | | 1/1990 | Powell et al. | |
| 4,990,826 A | | 2/1991 | Cocks et al. | |
| 5,016,144 A | | 5/1991 | DiMaggio | |
| 5,036,243 A | | 7/1991 | Cocks et al. | |
| 5,040,100 A | | 8/1991 | Di Gaetano | |
| 5,051,648 A | | 9/1991 | Misono et al. | |
| 5,089,745 A | | 2/1992 | Iannini | |
| 5,126,632 A | | 6/1992 | Parker | |
| 5,281,898 A | | 1/1994 | Albright | |
| 5,383,295 A | * | 1/1995 | Strattman | H01J 17/16 313/610 |
| 5,465,194 A | | 11/1995 | Currie | |
| 5,495,400 A | | 2/1996 | Currie | |
| 5,497,302 A | | 3/1996 | O'Donnell | |
| 5,530,630 A | | 6/1996 | Williams, Jr. | |
| 5,558,426 A | | 9/1996 | Cabanatan et al. | |
| 5,634,707 A | | 6/1997 | Bailey, Jr. | |
| 5,683,164 A | | 11/1997 | Chien | |
| 5,800,035 A | | 9/1998 | Aichele | |
| 6,045,244 A | | 4/2000 | Dixon et al. | |
| 6,116,762 A | | 9/2000 | Kutlucinar | |
| 6,116,763 A | | 9/2000 | King | |
| 6,168,301 B1 | | 1/2001 | Martinez et al. | |
| 6,220,733 B1 | | 4/2001 | Gordon | |
| 6,309,027 B1 | | 10/2001 | Smith | |
| 6,322,237 B1 | | 11/2001 | Lee | |
| 6,512,331 B1 | * | 1/2003 | Fu | H01J 9/241 313/483 |
| 6,601,979 B1 | | 8/2003 | Byrd et al. | |
| 6,641,041 B2 | | 11/2003 | Olds et al. | |
| 6,644,839 B2 | | 11/2003 | Lee | |
| 6,776,458 B1 | | 8/2004 | Wang | |
| 6,789,928 B2 | | 9/2004 | Khan | |
| 6,848,751 B1 | * | 2/2005 | Yuan | B60B 7/20 301/37.107 |
| 6,926,369 B2 | | 8/2005 | McCaster, III et al. | |
| 6,962,427 B2 | | 11/2005 | Gloodt et al. | |
| 7,079,042 B2 | | 7/2006 | Reim | |
| 7,111,967 B2 | | 9/2006 | Terry | |
| 7,296,918 B1 | | 11/2007 | Davydyuk et al. | |
| 7,354,182 B2 | | 4/2008 | Bartels | |
| 7,477,208 B2 | | 1/2009 | Matlock et al. | |
| 7,524,093 B2 | | 4/2009 | Sinnette et al. | |
| 7,611,267 B2 | | 11/2009 | Cooper | |
| 7,717,579 B2 | | 5/2010 | Huang | |
| 8,284,214 B2 | | 10/2012 | Gilbert | |
| 8,322,901 B2 | | 12/2012 | Michelotti | |
| 2003/0223243 A1 | | 12/2003 | Miller | |
| 2004/0125612 A1 | * | 7/2004 | Jackson | B60Q 1/326 362/500 |
| 2004/0130905 A1 | | 7/2004 | Olds et al. | |
| 2005/0248254 A1 | * | 11/2005 | Fu | H01J 9/24 313/484 |
| 2007/0274085 A1 | | 11/2007 | Hampton | |
| 2013/0175850 A1 | * | 7/2013 | Ryu | B60B 7/20 301/37.25 |
| 2014/0204344 A1 | | 7/2014 | Harris | |

* cited by examiner

VEHICLE RIM PLASMA DISPLAY ASSEMBLY, APPARATUS AND INSERT

FIELD OF INVENTION

The present invention is generally directed to motor vehicle accessories, and more notably, a system, apparatus and/or insert comprising an illuminated plasma display for rotatable objects, wherein the display visually appears as random electrical lightning patterns, and which is particularly suitable for rotatable vehicle rims and other transportation rims, which optionally have certain specific application to stylized vehicle rims.

BACKGROUND OF THE INVENTION

Automobile customization is a strong tradition since the time motorized vehicles were invented in the early 1900's, especially among younger adults. As a consequence, there are numerous illuminating systems found in the prior art.

Novelty vehicle lighting items have become very popular because of their ability to enhance the appearance of vehicles. In the past, lights were attached to vehicles only for purposes of visibility enhancement and safety. But now, lights are also used on vehicles for convenience and aesthetic purposes. For example, lights are now used as door lights, interior mirror lights, reading lights, etc.

There are numerous systems and devices for producing visual images and displaying visual data on vehicle rims in the art. One such technology employs one or more light emitting diodes (LED, or LEDs) which are operationally programmable, so that when the vehicle rim rotates, the LEDs (along with the rotation) rapidly engage and illuminate and blend to visually appear to a bystander as a design, artwork, or an image. This effect is known as "persistence of vision", and is also known as "scanning." Using this technology, electronic information about the image to be displayed is used to synchronize the illumination of the various LEDs at certain times during the rotation to create the image.

LED technology appears to be the prominent source of lighting for vehicles and for vehicle rims. For example, decorative LED lighting systems have been used on vehicles on a number of instances. U.S. Patent Application No. 2003/0223243 A1 (Miller) discloses an illuminating vehicle wheel device with LEDs mounted on a circuit board, which is then mounted to a vehicle wheel. U.S. Pat. No. 7,079,042 (Reim) discloses a system for providing illuminated displays on a vehicle wheel having LEDs mounted on a tire and also having a vehicle rim to display lighted messages. U.S. Pat. No. 6,789,928 (Khan) discloses a lighted wheel rim system having a wheel body with voids, so that LEDs and a battery are mounted within the voids. U.S. Pat. No. 6,641,041 (Olds et al.) discloses a system for directing a short burst of bright light onto rotating indicia on a vehicle wheel which makes the indicia on the rotating wheel appear to be stationary. U.S. Pat. No. 6,601,979 (Byrd et al.) discloses a wheel illumination device having a brush assembly in electrical contact with concentric conductor rings on a slip ring assembly mounted to the wheel. U.S. Pat. No. 6,322,237 (Lee) discloses a lighted wheel rim system having LEDs mounted within the rim of a tire. U.S. Pat. No. 6,116,763 (King) discloses a wheel illumination device requiring no external power and using magnetic and rotational forces to power the LEDs, however, such a system is inoperable as an illumination source when the wheels are not rotating. Other LED illumination systems for vehicles are found, for example, in U.S. Pat. No. 7,717,579 (Huang), U.S. Pat. No. 5,016,144 (DiMaggio), U.S. Pat. No. 4,562,516 (Chastain), U.S. Pat. No. 4,893,877 (Powell et al.), U.S. Pat. No. 6,168,301 (Martinez et al.), U.S. Pat. No. 5,634,707 (Bailey Jr.), U.S. Pat. No. 6,962,427 (Gloodt et al.), U.S. Pat. No. 7,296,918 (Davydyuk et al.), U.S. Pat. No. 6,220,733 (Gordon), U.S. Pat. No. 6,776,458 (Wang) and U.S. Patent Application Publication No. 2007/0274085 (Hampton).

Another popular lighting option for vehicle rims is through the use of fiber optic technology. Examples of fiber optic technology illumination systems can be found in U.S. Pat. No. 4,430,692 (Papadakis), U.S. Pat. No. 5,465,194 (Currie), U.S. Pat. No. 5,495,400 (Currie) and U.S. Pat. No. 6,644,839 (Lee).

Similarly, luminous display devices, as detailed in U.S. Pat. No. 5,383,295 to Strattman, are widely used for decorative or attention-grabbing purposes. The most common are those which comprise a simple or complex length of tubing filled with an inert gas such as neon, argon, mercury vapor, or mixtures thereof. Further, flat display devices serve as lighted signs having at least one transparent surface which may be masked to create letters, figures, or characters. Generally, these include two flat plates which are spaced from each other to form a chamber which is evacuated and then filled with the desired inert gas. Electrodes are arranged in such a manner as to setup a discharge path or paths in the chamber, and voltage is applied to cause ionization of the gas to produce a plasma color display. The primary object of the present invention is the use of the luminous plasma display device within the rim of a wheel to include the enabling requisite technologies. These technologies include the novel and synergistic incorporation of a dual slip ring design with ring ball bearing technology and a ballast to facilitate preclusion of the display's motion while indirectly mounted to a rotating axle, the protective coating placed over the display and the display being countersunk to the outer-most face of the tire's rim both to protect against environmental and road hazards.

Flat neon displays are also popular in the novelty products industry for the stunning visual effects produced, which resemble electrical lightning. Plasma displays typically employ two or more confronting (face-to-face) plates wherein a cavity is formed between the plates. The cavity is contiguously attached to a gas entry port incorporating a set of electrodes. In the manufacturing process, the cavity is evacuated of any air and a quantity of ionizable gas, such as neon, is injected under pressure and temperature into the cavity through the gas entry port which is then ideally hermetically sealed (so that the desired ionizable gas remains within the hermetically sealed, vacuum-tight cavity). The pressurized gas is then ionized by applying a voltage across the electrode set connected to the display, and when sufficient voltage and frequency is applied, the ionized gas is energized to ground potential to cause the gas to ionize through the natural surrounding capacitance between the ionized gas and ground potential, resulting in an appearance of a glow. This well-known phenomenon is discussed briefly, for example, in U.S. Pat. No. 4,703,574 (Garjian) and U.S. Pat. No. 4,742,278 (Iannini).

Furthermore, attempts to provide illumination to automobile wheels have also been described in the patent literature. In U.S. Pat. No. 1,643,593 to Styer et al, an electric lamp is arranged between a pair of wheel spokes. U.S. Pat. No. 2,526,548 to Franklin discloses an electric light mounted in the hub cap of each rear wheel of a vehicle and connected with the regular lightning system of such vehicle, the light being directed by a reflector through two series of openings in the hub cap. U.S. Pat. No. 3,099,401 to Bell describes illumination means for automobile wheels comprising translucent plastic spinner provided with an electrical bulb and mounted on the central portion of the conventional metallic hub cap, the bulb being connected to the car battery. U.S. Pat. No. 3,113,727 to Bradway covers a lighting system for automobile hub caps having lamp sockets grounded to hub caps for holding incandescent bulbs and connected electrically to the automobile battery. U.S. Pat. No. 3,340,389 to Senseman shows a lighted automobile wheel cap provided with a light bulb mounted along the central axis of the wheel cap and receiving electrical power through a spring-loaded brush assembly connected to the power source. While the aforementioned patents disclose either While all of the prior art displays are capable of providing relatively simple displays, none of the prior art devices are capable of providing a lightning-like effect within a vehicle's rim or tire assembly. Moreover, the geometry of all prior art planar devices have some object or component mounted at the center of the circle of rotation that blocks the presence of any illuminating element, thereby leaving a circular black or blank "hole" in the middle of the display, so that the entire display panel is not used for illumination. This geometric limitation problem, which is solved by the present invention, provides another reason why images (either text or designs) are displayed in a manner as to "twist" around the center of rotation.

Plasma typically is defined as "a hot ionized gas containing roughly equal quantities of positively charged ions and negatively charged electrons." Plasma is considered a fourth state of matter that is different from solids, liquids, and gases. Thus, for example, a plasma ball (also sometimes called a plasma globe, lamp, dome, or sphere) is a clear glass ball filled with a mixture of noble gases with a high-voltage electrode at its center. Plasma filaments extend from the electrode to the glass when electricity is supplied, creating fascinating beams of colored light. The electrode at the center of a plasma ball emits a high-frequency, high-voltage alternating electric current. This current flows through the plasma filaments to create colorful tendrils of light, to visually create a lightning effect. The colors of the tendrils depend upon the gases used inside the plasma ball, but commonly used gases in plasma balls include neon, argon, xenon, and krypton, or a combination of these elements.

The plasma ball (or, plasma globe) was invented by Nikola Tesla when he was experimenting with high-frequency electric currents in a glass vacuum tube (which is why the electrode at the center of a plasma ball is also often referred to as a Tesla coil). In U.S. Pat. No. 514,170 ("Incandescent Electric Light", 1894), Tesla discloses a plasma lamp. Here, Tesla used an incandescent-type lamp globe with a single internal conductive element and excited the element with high voltage currents from a Tesla coil, thus creating the brush discharge emanation. He gained patent protection on a particular form of the lamp in which a light-giving small body or button of refractory material is supported by a conductor entering a very highly exhausted globe or receiver. Tesla called this invention the single terminal lamp, or, later, the "Inert Gas Discharge Tube." The modern version of the plasma ball was designed by Bill Parker in 1970, and uses a mixture of xenon, krypton, neon and other gases to create the vivid colors and complex patterns typically seen in the plasma ball novelty device.

Therefore, a need exists in the art to provide an illumination system, apparatus and/or insert for use within a vehicle's rim which is untraditional and does not require the use of any form of a LED. The present invention solves this need, as the present invention substantially departs from the prior art's use of traditional LED technology to illuminate a vehicle's rim, and in doing so, provides an aesthetically appealing and highly entertaining pattern of lightning effects on the vehicle rim. The resulting plasma reaction is phototropic, stimulating and aesthetically pleasing to the human eye.

As such, it is a primary object of the present invention to provide a new, unique ornamental illuminating display system, apparatus and/or insert for use within a vehicle's rim or wheel.

It is another principal object of the present invention to provide an illuminating inert gas-filled plasma disk or plate assembly for use within and/or on vehicle wheels which is operable on nearly any type of vehicle rim or wheel. It is also an object of the invention to provide such an assembly which may be readily mounted on and dismounted from vehicles and vehicle wheels.

It is still another object of the present invention to provide a new, unique apparatus, system and/or device for illuminating vehicle wheels.

It is a further object of the present invention to provide a non-LED luminous display system, apparatus and/or insert especially adapted for retrofitting into existing vehicles.

Still yet another object of the present invention is to provide a new lighting device for vehicle rims or wheels which the advantages of the prior art while simultaneously overcoming some of the disadvantages normally associated with the prior art solutions.

Still another object of the present invention is to provide a new lighting device for vehicle wheel assemblies for illuminating the outer portion of a wheel, and more particularly, illuminating the vehicle's rim.

It is a further object of the present to employ control circuitry adapted to control arcing between any electrical contacts and which compensates for an electrical shortage through the discharge of electricity into the electrical system when a momentary electrical stoppage occurs.

It is a further object of the present invention to provide a luminous plasma rim system which may be readily mounted and dismounted from vehicles.

It is also an object of the present invention to provide a plasma rim system, which may be rigidly mounted to a vehicle, is rigid enough to withstand external forces and vibrations, and is sturdy and durable.

It is also an object of the present invention to provide improved elements and arrangements thereof for the purposes described which is dependable and fully effective in accomplishing its intended purposes.

A primary object of the present invention is to provide a new lighting or illuminating device for vehicle wheel assemblies which is not anticipated, rendered obvious, suggested, or even implied by any of the prior art illuminating devices for wheels, either alone or in any combination thereof.

SUMMARY OF THE INVENTION

The following summary of the invention is provided to facilitate an understanding of some of the innovative features unique to the present invention, and is not intended to be a full description of variations that may be apparent to those of skill in the art. A full appreciation of the various aspects of the invention can be gained from the entire specification, claims, drawings, and abstract taken as a whole.

In accordance with one embodiment of the present invention, a system, apparatus and/or insert for illuminating a vehicle's rim or wheel assembly is provided, Generally, the vehicle's wheel assembly can be defined as including a vehicle's tire surrounding a rim and a center hub mount support on the rim which is adapted to mechanically engage the vehicle's axle hub. The present invention is a plasma disk assembly and preferably comprises a plasma disk display having a controllable power source PS, a ball bearing system or mount, at least one electrode assembly electrically connecting the power source to the plasma disk, and a preferably weighted, but possibly non-weighted, ballast system. The present assembly is adapted to be mechanically mounted (and thereby be fixed) from the center hub mount support so as to be fixed to the vehicle's wheel assembly, without having any rotation.

The plasma display rim assembly according to the present invention includes a device that illuminates a wheel of a vehicle by generating a highly realistic "lightning" display. The present invention provides a significant improvement in that it remains essentially stationary with respect to the wheel while mimicking the look of lightning in a manner that surpasses any other technology available. The lighted wheel rim system may be installed by the manufacturer in the factory or retrofitted after market.

This disclosure describes numerous specific details that include specific structures and elements, their particular arrangement, and their particular functions in order to provide a thorough understanding of the present invention.

The novel features of the present invention will become apparent to those of skill in the art upon examination of the following detailed description of the preferred embodiment or can be learned by practice of the present invention. It should be understood, however, that the detailed description of the preferred embodiment and the specific examples presented, while indicating certain embodiments of the present invention, are provided for illustration purposes only because various changes and modifications within the spirit and scope of the invention will become apparent to those of skill in the art from the detailed description, drawings and claims that follow.

BRIEF DESCRIPTION OF THE DRAWINGS

The accompanying figures further illustrate the present invention and, together with the detailed description of the preferred embodiment, assists to explain the general principles according to the present invention.

Additional aspects of the present invention will become evident upon reviewing the non-limiting embodiments described in the specification and the claims taken in conjunction with the accompanying figures, wherein like reference numerals denote like elements.

DETAILED DESCRIPTION OF THE PREFERRED EMBODIMENT

Figure 1:
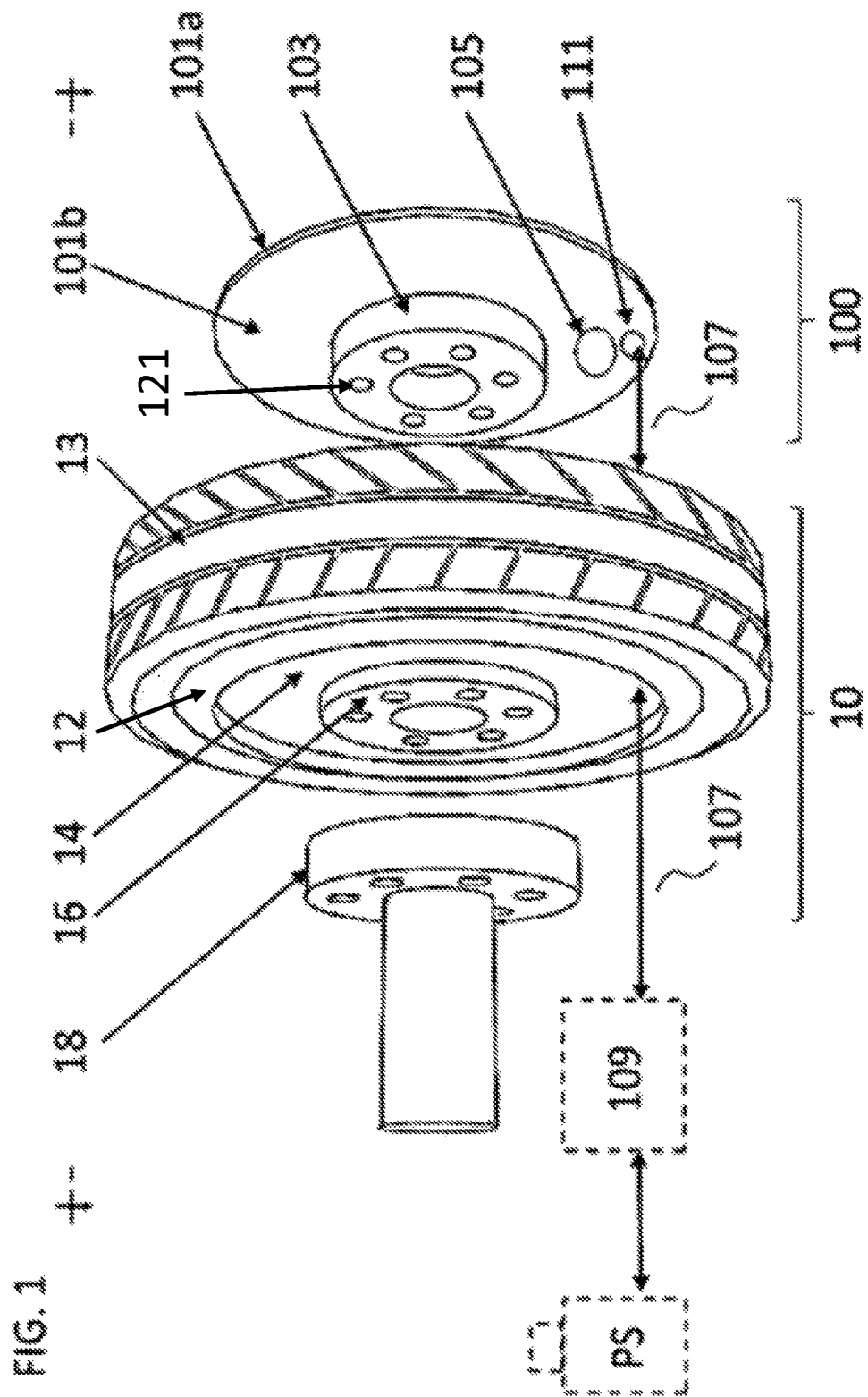
FIG. 1 illustrates an exploded view of one representative embodiment of the present invention as may be seen from underneath a vehicle.
Figure 2:
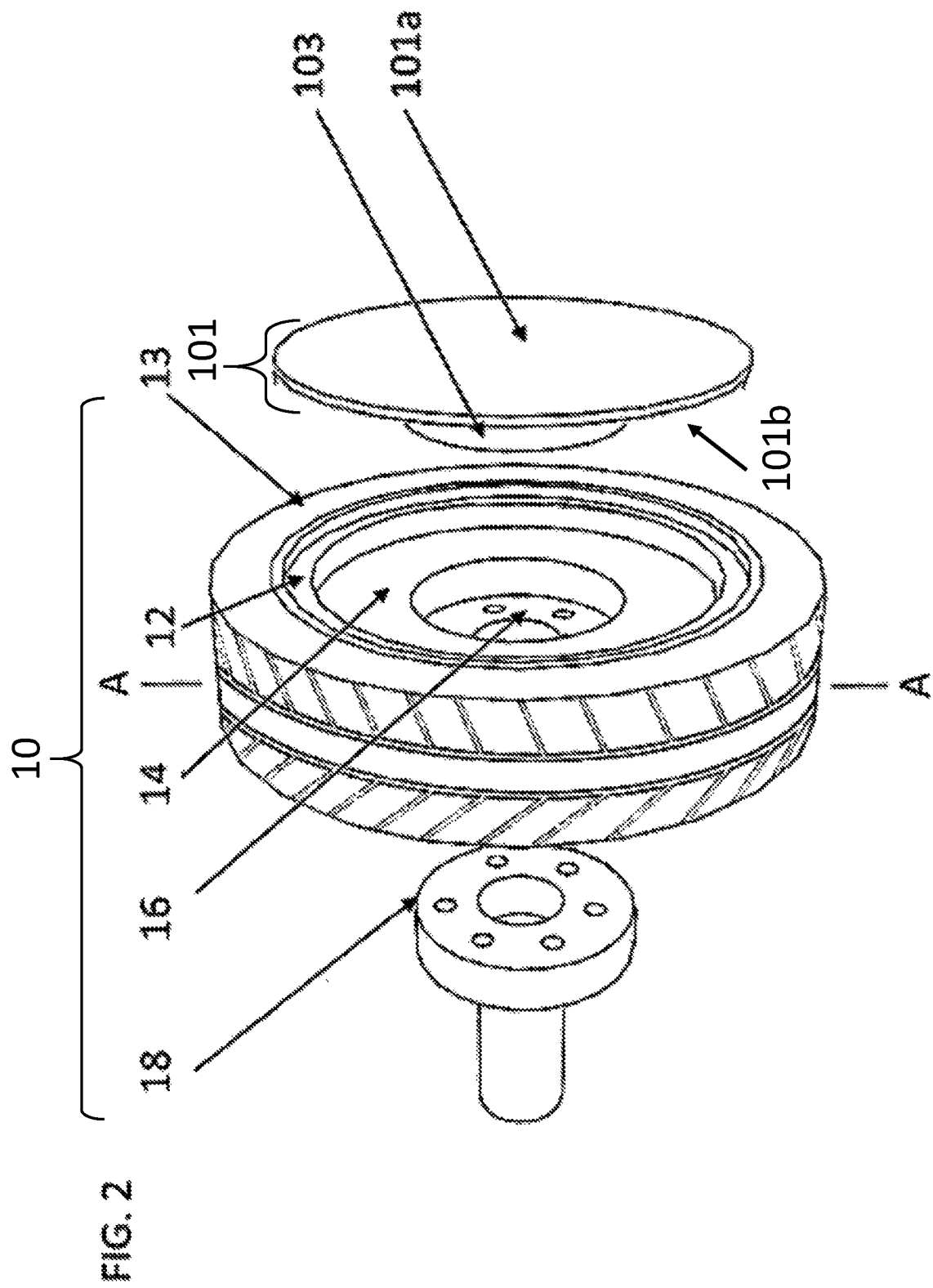
FIG. 2 illustrates an exploded view of FIG. 1 as may be seen from outside and adjacent to the vehicle.

As seen in FIG. 1, a conventional vehicle's wheel assembly 10 generally includes a vehicle's tire 13 surrounding a rim 14, and a center hub mount support 16 upon the rim 14 which is adapted to mechanically engage the vehicle's axle hub 18 in a conventional manner, so that when the axle hub 18 rotates, so does the tire 13, rim 14 and the hub mount support 16. In this regard, the rim 14 has a lip 12 along a circumference thereof.

The present invention is a gas plasma disk assembly 100 comprising a plate assembly 101 that comprises at least an outer plate 101 *a* and an inner plate 101 *b* which are sealed (or fused) together along their respective peripheral rims 119 to thereby define a cavity 102 (or envelope) therein. Both plates 101 *a*, 101 *b* may be coated with a protective material (such as hardened resin) or protective membrane for protection from road hazards and to shield against impacts and any contaminants. Either the outer plate 101 *a* or the protective shield may, or may not, include decorative details which may include designs, letters, numbers, or lines from which the lightning may appear to emanate. Thereafter, the cavity 102 is injected under pressure with a predefined ionizable gas (not shown) so that the cavity 102 is now defined as a gas discharge area. The inner plate 101 *b* of the plasma disk assembly 100 is in electrical communication with the at least one power source PS, the at least one electrode 111 and the ionizable gas in the cavity 102, a communication path which allows for providing energy to the ionizable gas within the cavity 102.

Further, the plasma disk assembly 100 ideally includes a weighted ballast system 105 preferably positioned towards the bottom of the inner plate 101 *b* and a ball bearing mounting system 103 preferably centrally located on the middle portion of the inner plate 101 *b*. The ball bearing mounting system 103 preferably includes a plurality of ball bearings within a chamber to thereby define a ball bearing chamber 120 (seen in FIG. 3) which allows the assembly 100 to stay in substantially fixed geometric position so that while the wheel assembly 10 rotates, the plasma disk assembly 100 does not. This desired result may also be accomplished by way of an engineered gearing mechanism, an extremely low-friction interface, or other like technologies. Further, while the ballast system 105 is preferably positioned on the inner plate 101 *b*, it may also be located within the ball bearing system 103 in order to further help stabilize the assembly 100 from any rotation, so that the assembly 100 does not rotate relative to the functional rotation of the vehicle's wheel assembly 10 (e.g., tire 13, rim 14 and axle hub 18). As such, the plasma disk assembly 100 is adapted to be mechanically mounted (and thereby be fixed) to the vehicle's center hub mount support 18 so as to be fixed to, but not rotational with, the vehicle's wheel assembly 10. It is also possible, that these design objectives may also be accomplished by other means, to include gearing systems or the like.

Figure 3:
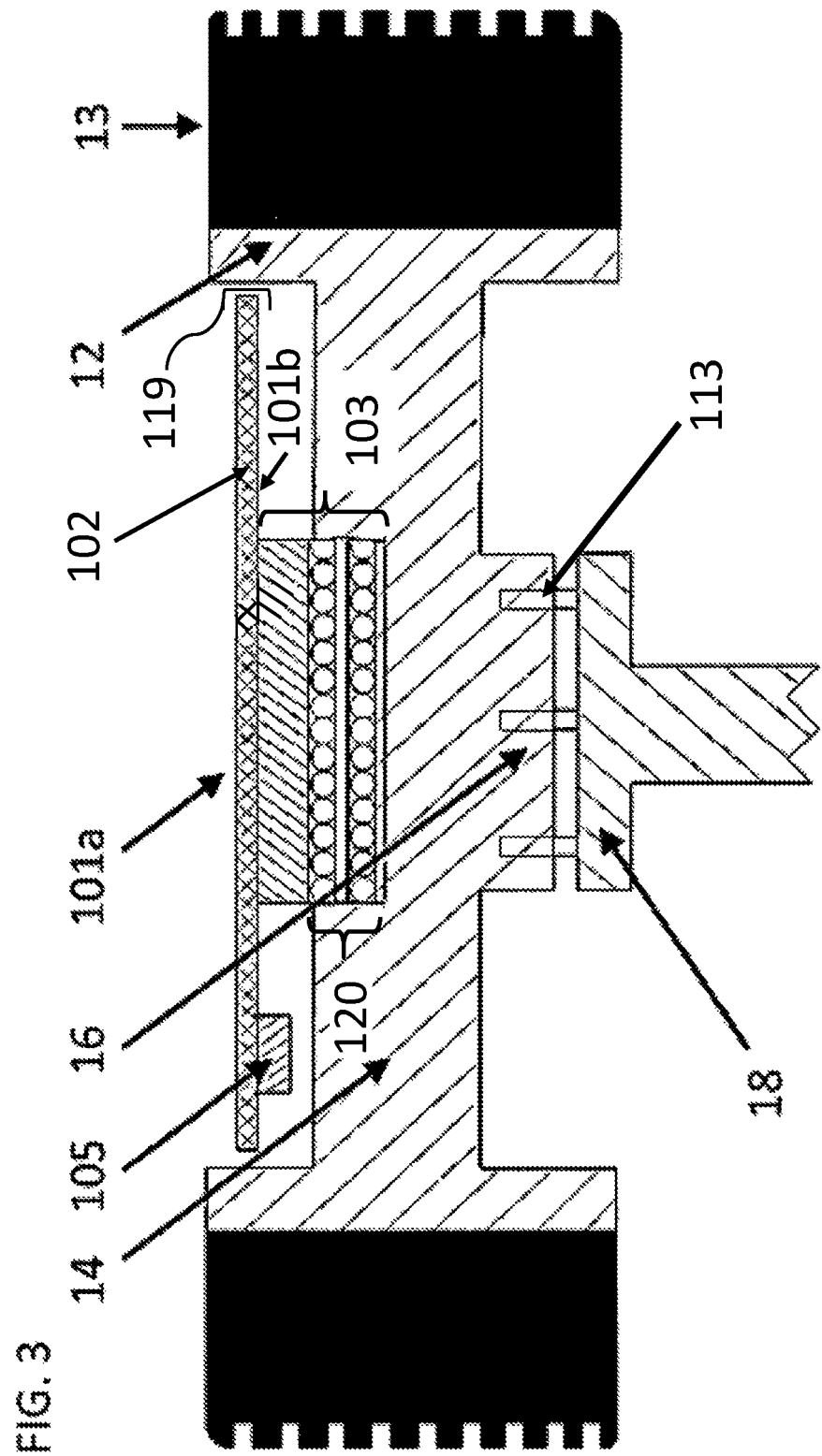
FIG. 3 is a plan view of FIG. 2, illustrating the present invention as it has been inserted into the vehicle's rim.
Figure 4:
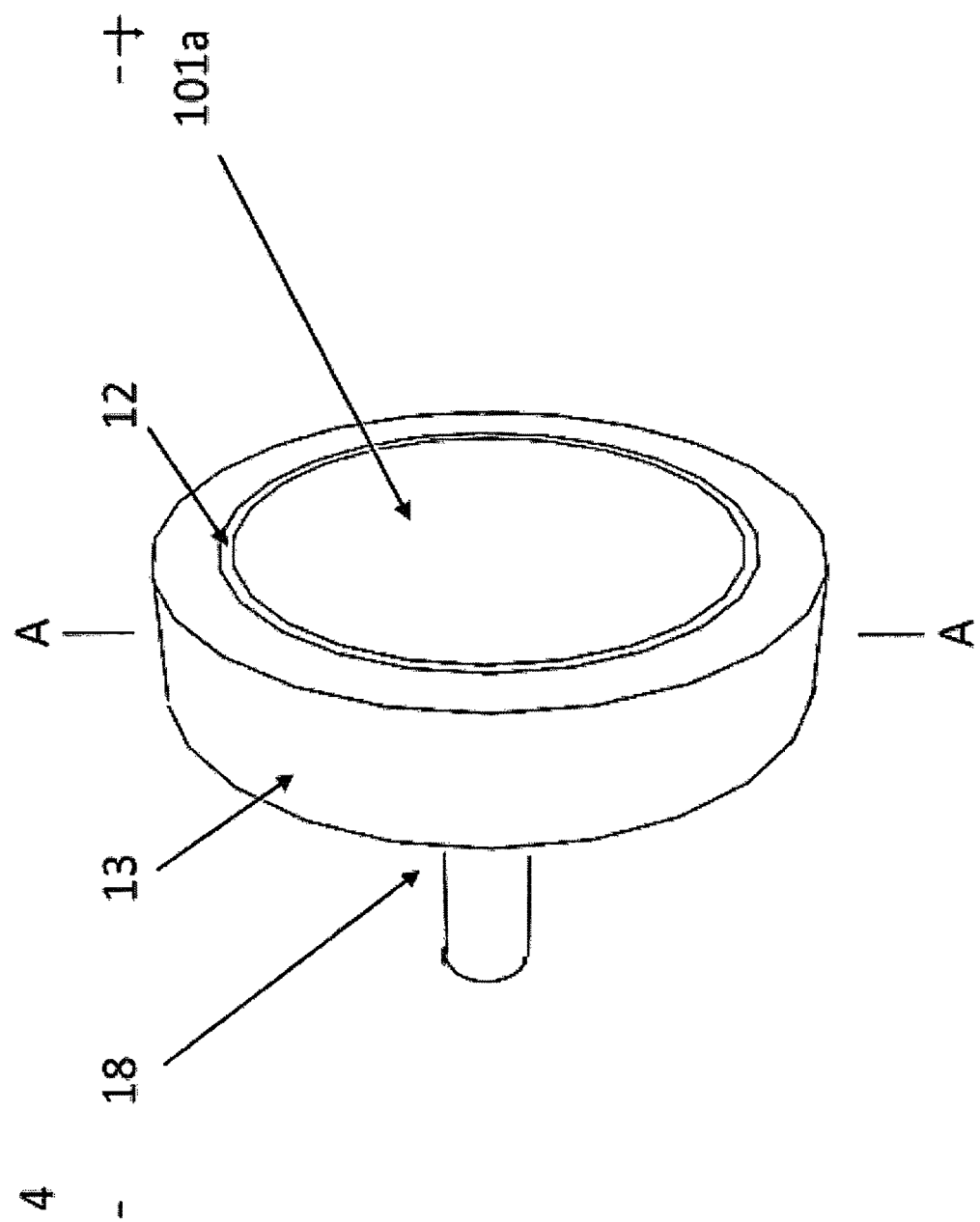
FIG. 4 illustrates a cross section of FIG. 3 along lines A-A.
Figure 5:
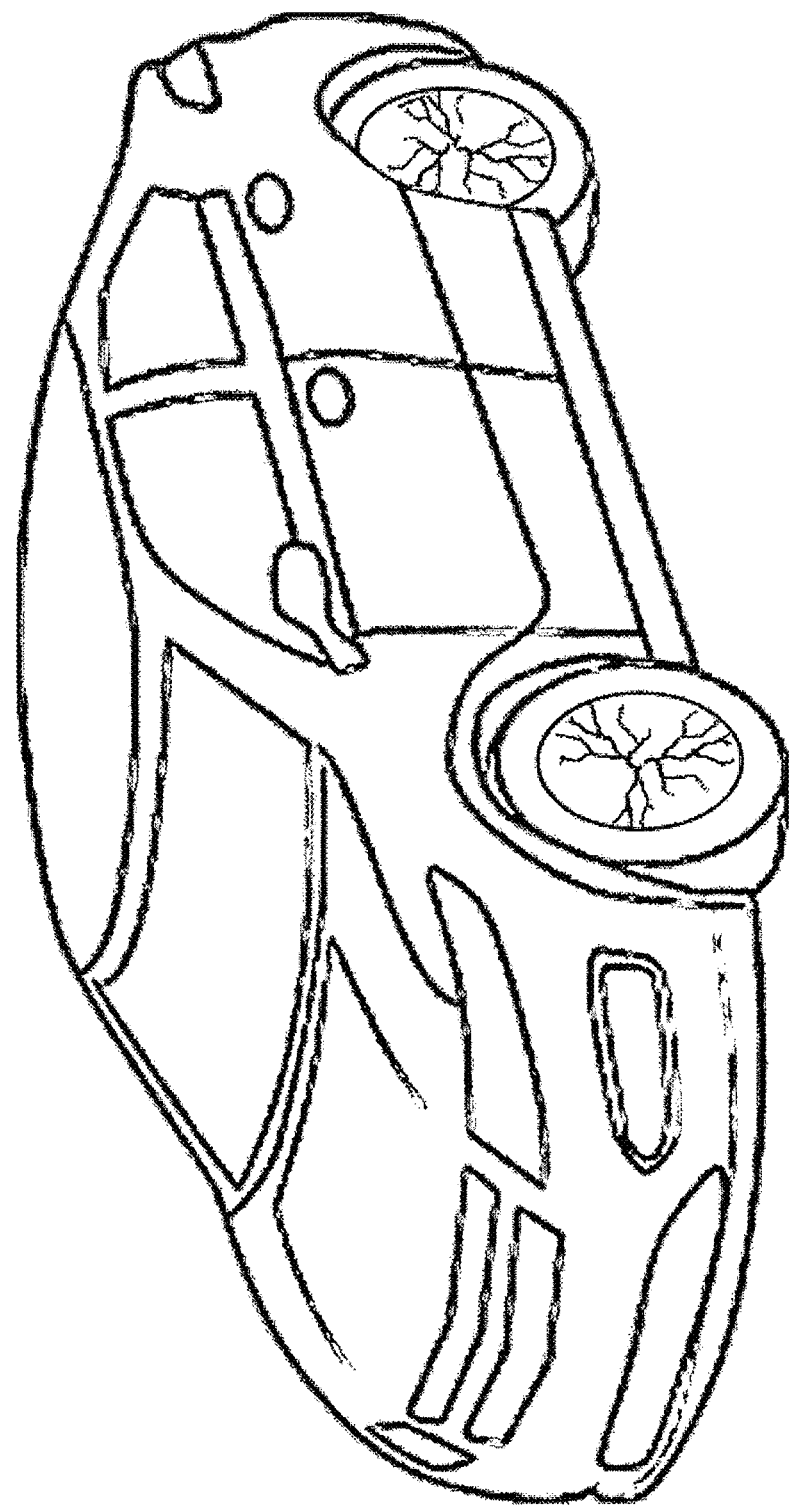
FIG. 5 illustrates a side plan view of the present invention as how it might visually appear to a bystander on the right side of the vehicle.

As seen in FIG. 3, the plasma disk assembly 100 is preferably, but optionally recessed into (or, removably insertable into) the vehicle's rim 14. In this ideal design, the vehicle's recessed rim 14 is a semi-enclosed space which offers protection for the display assembly 100 from external impacts and elements, as well as to help prevent the light emitted from the assembly 100, when activated, from traveling fore or aft of the vehicle in accordance with automotive safety best practices.

The plates 101 *a*, 101 *b* may be composed of any of several types of relatively high melting-point translucent materials. The design of each plate 101 *a*, 101 *b* may be square, rectangular, or of any desired shape, and may or may not be flat, although for purposes of explanation, the present embodiment will be assumed to utilize a flat circular plate (as most vehicle rims are circular). The outer plate 101 *a* and the inner plate 101 *b* both preferably employ an engineered protective layer to defend against impact and contaminant damage. Each plate 101 *a*, 101 *b* is preferably transparent, although other effects may be had or enhanced by the use of frosted or other translucent material. Conductive materials may be integrated into desired shapes within the assembly 100 to create the appearance of lightning emanating from the additional material. Fused to the transparent outer plate 101 *a* is the inner plate 101 *b*, which may be of the same material, size and shape as the first plate, but which has its major central portion removed.

Further, in one preferred embodiment, the weighted ballast and bearing system 105 is adapted to ensure the disk assembly 100 is stabilized and is geometrically fixed so that the entire plasma disk assembly 100 does not move while the vehicle's wheel assembly 10 is in motion (e.g., rotates).

Preferably, the power source PS and the at least one electrode are adapted to provide, ideally, a high-frequency, high voltage signal to the cavity 102 sufficient to produce visible charges in the gas discharge area when the disk assembly is coupled with, or inserted into, the vehicle's rim 14. The power supply PS may either be electrically coupled directly to a vehicle's power supply (e.g., battery), at least one battery mounted in the axle hub 16 (not shown), or could be an electromechanical power source utilizing the Faraday Effect with the rotation of the rim 14. Further, an actuator (not shown) may be electrically coupled to (or, in electrical communication with) the power supply PS for selectively controlling the plasma display. The actuator may be a button positioned on the hub or in the vehicle, or may be remotely controlled. Alternatively, the actuator may include a switch that is actuated by centrifugal force so that the light emitters are turned on when the rim hub axle 16 rotates, and turn off when not rotating, or vice versa as desired. Also preferably, the actuator is ideally disposed in the passenger compartment of the vehicle.

In another embodiment of the present invention, the power source may optionally be the vehicle's main battery source to provide power to each assembly 100 on each rim, in parallel (independently). This could be achieved by using separate wires which run through the chassis to each wheel well. These wires can connect to a first slip ring electrical connector (not shown) with one half affixed firmly off the axle and the other half on the inside the wheel rim. The first slip ring may then be connected to a wire that passes through an opening in the rim, to a second slip ring electrical connector. The second slip ring is affixed to both the rim 14 and the inner plate 101 *b* of the plasma disk assembly 100, which then of course passes into the display cavity 102 and energizes the gas. Using the double-slip ring connector design allows the power to flow from a fixed position (wire coming off the battery) through a rotating surface (the rim) to another fixed surface (the plates).

In another embodiment, an optional control circuit 109 may be utilized which is in electrical communication with both the power source PS and the plasma disk assembly 100. The control circuit may be a switch, or may be configured (or, programmed) to automatically control the electrical charge and or signals flowing to the plasma disk assembly. The control circuit can be configured to change light patterns automatically based upon, for example, the voltage and/or current applied to the plasma disk assembly 100. The optional control circuit 109 can be responsive to remote-control signals indicative of a pattern of light illumination, which might be useful when the vehicle rims are not rotating but illumination is still desired (say, for example, illuminating the plasma disk assembly during an auto show, when the vehicle is not moving). The control circuit 109 may also be configured to change the intensity of the lightning pattern in the plasma disk display so that it is in synchrony with an audio source (such as the vehicle's audio and/or video sound system).

The control circuit 109 may be a computer, controller or microcontroller which electrically communicates with the disk display 100, which is located adjacent to the vehicle rim, or may be located within the disk display itself. The controller can directly (wired) or indirectly (wireless) communicate with any form of electronic device, including laptop computers, programmable remotes and related devices. The controller may be optionally programmed to control the display of images on the disk display as a specific sequence of images, or random images (which is more prominent and visually mimics Earth's natural lightning storm display). The controller's specific hardware and/or software may vary depending upon the vehicle specifications and the type of gas used to generate the plasma display.

According to another embodiment of the present invention, a transparent plate assembly 101 comprising an outer plate 101 *a*, and an inner plate 101 *b* having a cavity 102 (or, envelope) therein is provided so that the cavity 102 is filled with an ionizable gas such as an inert gas (which is illustrated as an "X" pattern) (e.g., neon, argon, krypton, helium, xenon, argon+mercury, neon+mercury or the like, or any combination thereof). At least one electrode 111 is provided in electrical communication with the gas in the assembly 101. An electrical power source PS for providing a high-frequency, high voltage signal is connected to the electrode 111. By applying the high-frequency, high voltage signal to the electrode 100 by the power source PS, the gas within the cavity 102 is ionized (charged) and a visible, random electrical discharge patterns appear to beholders of the plate assembly 101 which look like random fingers or tendrils of electricity or lightning. The result is a dramatic lightning-like or crackling visual effect on the outer plate 101 *a*. This dramatic visual effect is improved by employing a disk assembly having a shape adapted for insertion into a vehicle's rim 14.

Preferably, only a single electrode is required to be connected to the plate assembly 101 and can be a metal electrode contained within the disk assembly and connected by a wire passing through and sealed to the surface of the disk assembly in a manner well known to those skilled in the art of making gas plasma displays and the like. Additionally, the control circuitry which provides ionization to the gas in the disk assembly is preferably a high-frequency, high voltage power source that requires only one external capacitive electrode or input to the plasma disk assembly.

In operation, ionization (or, ignition) of the gas inside the plasma disk assembly 100 appears to a bystander to occur extending outwardly from the center of the disk assembly without any return connection, when in fact, the high-frequency electrical currents are flowing through the capacitive reactance of the plasma disk assembly with the air, where the assembly's plates acts as the dielectric between the two.

Unlike the prior art, the present invention does not rely on providing illumination through the use of LEDs, organic LEDs, electromechanical strips (ELs), liquid crystal displays (LCDs), thin film transistor LCDs, small light bulbs, incandescent lights, fluorescent lights, electroluminescent panels, ultraviolet lights or any combination thereof. Rather, the present invention's illumination characteristics are formed purely from the gas plasma discharge produced when an electrical current is introduced to the gas within the confines of the sealed disk assembly.

Obviously, vehicles come in different shapes and/or sizes, and the same is true for vehicle rims. The present invention's disk assembly 100 is not limited to any particular vehicle rim specification, and rather, the present invention 100 is designed to interface with any rim on a vehicle, regardless of size or shape of the rim. As such, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The above and other objects of the invention are realized in a specific illustrative embodiment of a plasma disk assembly for use on a vehicle wheel having a hub and lug bolt 113 system of wheel attachment (as seen, for example, in FIG. 3). The plasma disk assembly 100 includes a ball bearing mounting system 103 for mounting to the vehicle's wheel rim 14 (which further couples to the vehicle's axle hub 18), where the ball bearing mounting system 103 is attached to a surface that has mounting holes 121 adapted to match (and register) with any lug bolt 113 design on the axle hub 18.

The disclosed invention may optionally be configured to be in electrical and/or electromechanical communication with a portable or stationary computer that includes programming software which controls the control circuit 09 and which provides, controls, imports, manipulates, stores and manages selective display visual information which may be displayed on the present plasma disk display on the vehicle rims (whether or not the rims or rotating).

The present luminous vehicle rim plasma display system, apparatus and insert provides the user with an unparalleled media for personalized style, and dynamic expression within one's wheel rims. The novel design employs a technology never before integrated into a vehicle accessory which produces an "electric" or "lightning" effect when activated that surpasses any other existing rim design and represents a quantum leap in vehicle wheel customization. Further, the display's plasma response can be rendered responsive to noise or intentional electrical modulations. In the off state, the display provides an attractive "blacked-out" rim appearance which is also highly desired by many vehicle accessory enthusiasts. The present invention results in an apparatus or insert which produces a strikingly pleasing or aesthetic illumination which resembles electrical lightning, and imparts to the beholder a sense of shock and awe.

Because the present invention is alternatively described as an "insert" within an enclosure, those of skill in the art will recognize that the present invention is not limited to insertion only into a vehicle rim, but can be insertable in other devices as well, including, but not limited to, a steering wheel, a spare tire rack, cavities for audio speakers, speakers themselves, the vehicle's cigarette lighter port as well as a vehicle's overhead dome lamp.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Other variations and modifications of the present invention will be apparent to those of ordinary skill in the art, and it is the intent of the appended claims that such variations and modifications be covered. The particular values and configurations discussed above can be varied, are cited to illustrate representative embodiments of the present invention and are not intended to limit the scope of the invention. It is contemplated that the use of the present invention can involve components having different characteristics as long as the principle is followed.

I claim:

1. A gas plasma disk assembly for use with a vehicle's wheel assembly having a vehicle rim, the gas plasma disk assembly comprising:
    an outer plate and an inner plate which are sealed together along their respective peripheral rims to thereby define a cavity therein;
    a gas inside the cavity so that the cavity is now defined as a gas discharge area;
    at least one power source;
    at least one electrode in electrical communication with the power source and a surface of the inner plate, the power source adapted to generate a signal to an ionizable gas within the cavity;
    a ballast system; and
    a ball bearing mounting system located on a predefined portion of the inner plate;
    wherein the plasma disk assembly does not rotate relative to any rotation of the vehicle's wheel assembly when mounted to the vehicle's rim, and wherein when the signal is applied to the cavity, the gas within the cavity is ionized, resulting in visible, random electrical discharge patterns which look like random fingers or tendrils of electricity or lightning.

2. The assembly of claim 1, wherein the predefined ionizable gas is selected from the group of neon, argon, mercury vapor, xenon, helium, krypton, or combinations thereof.

3. The assembly of claim 2 wherein the outer plate and the inner plate are selectively coated with a protective for protection from road hazards, from impacts and from contaminants.

4. The assembly of claim 2 wherein either the outer plate, the inner plate or a protective shield may include decorative details from which the lightning may appear to emanate.

5. The assembly of claim 2 wherein the outer plate and the inner plate are selectively coated with a protective for protection from road hazards, from impacts and from contaminants.

6. The assembly of claim 1, the ball bearing mounting system further comprising a plurality of ball bearings within a chamber defining a ball bearing chamber, the ball bearing chamber being adapted to allow the assembly to remain in substantially fixed geometric position relative to the rotation of the vehicle's wheel assembly.

7. The assembly of claim 1 wherein the predefined portion of the inner plate is centrally located on a middle portion of the inner plate.

8. The assembly of claim 1 further comprising a control circuit which is programmed to control an electrical charge flowing to the plasma disk assembly, and which is further adapted to communicate with an electronic device both wirelessly and directly.

9. A plasma gas discharge disk apparatus for mounting to a vehicle's wheel assembly having a vehicle rim, the apparatus comprising:
    a plate assembly defined by an outer plate and an inner plate which are fused together along their respective peripheral rims to thereby define a cavity therein;
    a predefined noble gas, the noble gas being within the cavity to define a gas discharge area;
    at least one power source;
    at least one electrode in electrical communication with the power source and a surface of the plate assembly, the power source adapted to generate a signal to an ionizable gas within the cavity;
    a ballast system coupled to the inner plate and adapted to substantially prevent an insert from rotation relative to any rotation of the vehicle's rim; and
    a ball bearing mounting system centrally located on the inner plate adapted to allow the vehicle rim to rotate while further substantially preventing the insert from rotation relative to any rotation of the vehicle's rim;
    wherein when the signal is applied to the cavity, the gas within the cavity is energized to visually appear on the plate assembly as visible, random electrical discharge patterns which look like tendrils of electricity.

10. The apparatus of claim 9 wherein the ball bearing mounting system mounts to a vehicle's rim through one or more mounting holes adapted to register with any lug bolt pattern on the axle hub.

11. The apparatus of claim 9 wherein the ionizable gas is selected from the group of neon, argon, mercury vapor, xenon, helium, krypton, or combinations thereof.

12. The apparatus of claim 9, the ball bearing mounting system further comprising a plurality of ball bearings within a chamber defining a ball bearing chamber, the ball bearing chamber being adapted to allow the apparatus to remain in substantially fixed geometric position relative to the rotation of the vehicle's wheel assembly.

13. The apparatus of claim 9 further comprising a control circuit which is programmed to control an electrical charge flowing to the apparatus, and which is further adapted to communicate with an electronic device both wirelessly and directly.

14. The apparatus of claim 9 wherein the outer plate and the inner plate are selectively coated with a protective for protection from road hazards, from impacts and from contaminants.

15. A plasma disk display insert removeably insertable onto a vehicle's wheel assembly, the vehicle's wheel assembly having a vehicle's tire surrounding a vehicle's rim and a center hub mount support upon the vehicle's rim which is adapted to mechanically engage a vehicle's axle hub, so that when the vehicle's axle hub rotates, so does the vehicle's tire, vehicle's rim and the vehicle's hub mount support, the plasma disk display insert comprising:
    an outer plate and an inner plate which are fused together along their respective peripheral rims to thereby define a cavity therein;
    a predefined ionizable gas which is within the cavity so that the cavity is now defined as a gas discharge area;
    at least one power source, the power source adapted to generate a signal to the ionizable gas within the cavity;
    at least one electrode in electrical communication with the power source and a surface of the inner plate;
    a ballast system coupled to the inner plate; and
    a ball bearing mounting system located on a predefined portion of the inner plate;
    wherein when the signal is applied to the cavity, the gas within the cavity is ionized, resulting in visible, random electrical discharge patterns which look like lightning, and wherein the plasma disk display insert does not rotate relative to any rotation of the vehicle's wheel assembly when within the vehicle's rim.

16. The display insert of claim 15 wherein the predefined ionizable gas is selected from the group of neon, argon, mercury vapor, xenon, helium, krypton, or combinations thereof.

17. The assembly of claim 15, the ball bearing mounting system further comprising a plurality of ball bearings within a chamber defining a ball bearing chamber, the ball bearing chamber being adapted to allow the assembly to remain in substantially fixed geometric position relative to the rotation of the vehicle's wheel assembly.

18. The assembly of claim 15 further comprising a control circuit which is programmed to control an electrical charge flowing to the plasma disk assembly, and which is further adapted to communicate with an electronic device both wirelessly and directly.

19. The plasma disk display insert of claim 18, wherein the power source is configured to electronically couple to an actuator, thereby allowing for selective control of the plasma disk display insert.

* * * * *